Oct. 26, 1937. E. R. GOLDFIELD ET AL 2,097,095
X-RAY APPARATUS
Filed April 2, 1937 2 Sheets-Sheet 1

INVENTORS
EDWIN R. GOLDFIELD, CAPERTON B. HORSLEY &
BY RALPH C. SCHIRING
ATTORNEY

Oct. 26, 1937.　　　E. R. GOLDFIELD ET AL　　　2,097,095
X-RAY APPARATUS
Filed April 2, 1937　　　2 Sheets-Sheet 2
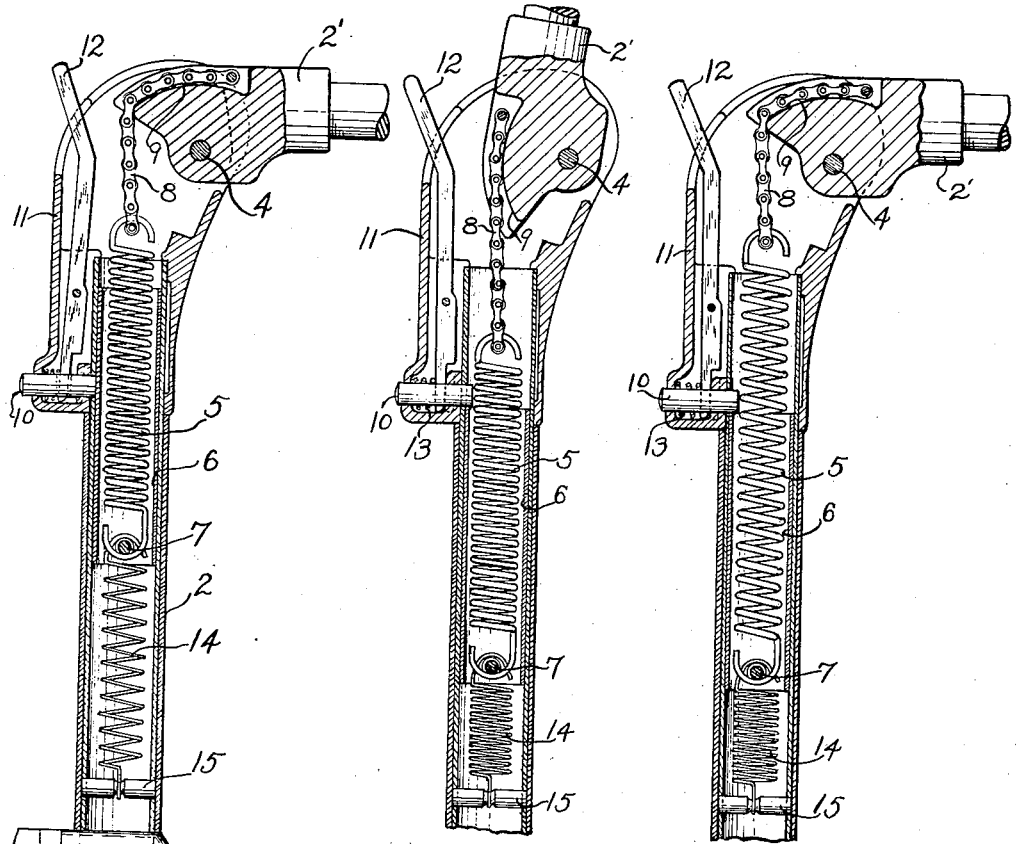
FIG. 5　　　FIG. 6
FIG. 4
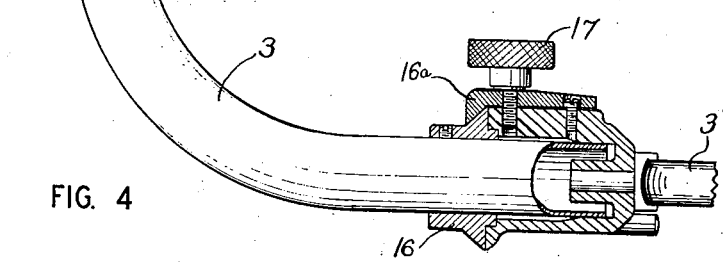
INVENTORS
EDWIN R. GOLDFIELD, CAPERTON B. HORSLEY &
BY　RALPH C. SCHIRING
Brockett, Hyde, Higley & Meyer
ATTORNEYS Patented Oct. 26, 1937

2,097,095

UNITED STATES PATENT OFFICE 2,097,095

X-RAY APPARATUS

Edwin R. Goldfield, University Heights, Caperton B. Horsley, Gates Mills, and Ralph C. Schiring, Cleveland, Ohio, assignors to Picker X-Ray Corporation Waite Manufacturing Division, Inc., Cleveland, Ohio, a corporation of Ohio Application April 2, 1937, Serial No. 134,490

12 Claims. (Cl. 250—34)

This invention relates to X-ray apparatus characterized by cooperative tube head and fluoroscopic screen units adjustably mounted upon a base.

More particularly the apparatus contemplated includes bracket means supporting the head and screen in spaced relation on opposite sides of a horizontal axis about which they are adjustable together as a unit, the bracket being mounted on the base to permit such adjustment and also vertical adjustment of the axis.

An object of the invention is to provide improved balance of the parts about such axis. This is accomplished, as will appear, by location of the axis intermediate the head and the screen so that as another object of the invention, the head has increased range of adjustment relative to the base.

According to the invention the bracket carrying the screen is articulated to permit adjustment of the screen toward and from the head, and another object of the invention is to provide improved means for balancing the screen when the bracket is so disposed that the screen is above the head.

The tube head contemplated contains diaphragm means for controlling the X-ray beam, and another object of the invention is to provide improved means permitting the operator at the screen to adjust the diaphragm at the tube head, such means being arranged to be easily detachable from the tube head.

Figure 1:
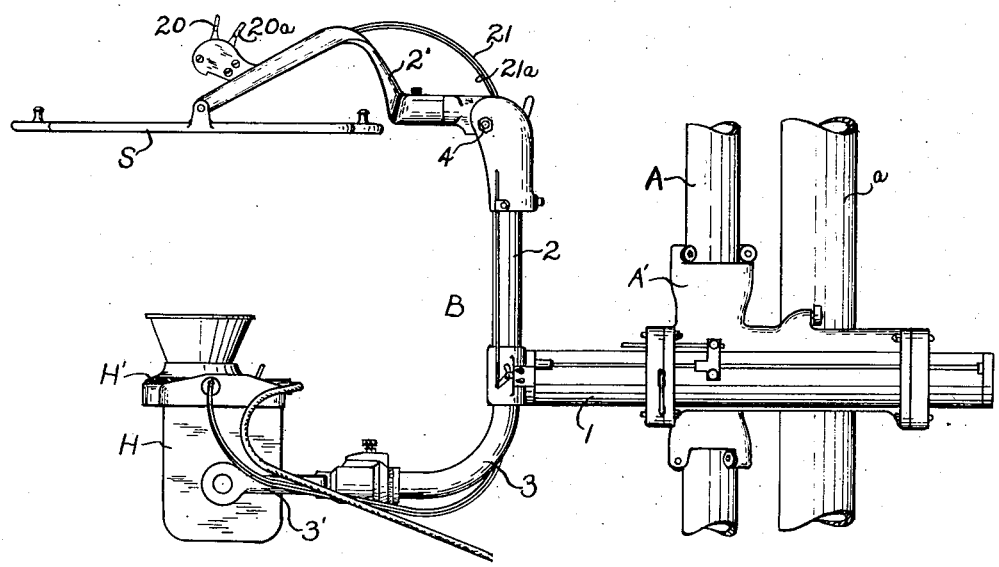
Figure 2:
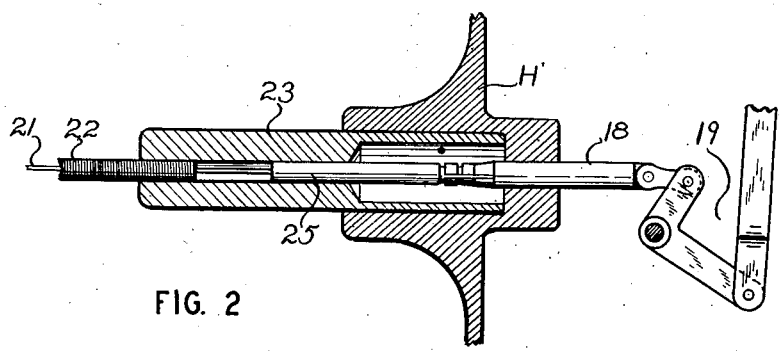
Figure 3:
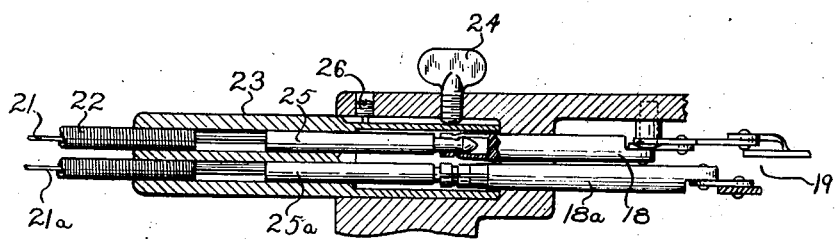

The exact nature of the invention together with further objects and advantages thereof, will be apparent from the following description taken in connection with the accompanying drawings, in which Fig. 1 is a view in elevation showing pertinent parts of apparatus embodying the invention; Figs. 2 and 3 are enlarged sectional details showing the detachable connection for diaphragm control; Fig. 4 is an enlarged view generally in horizontal section showing details of the bracket which carries the tube head and fluoroscopic screen, and of the screen balancing means within the bracket; Figs. 5 and 6 are views in sectional elevation showing in two positions, parts appearing in Fig. 4.

With reference now to the drawings, A is an upright column part of a base along which a carriage A' is movably mounted, guided against motion about the column A by the column a, within which may be located counterbalance means for the carriage A'. B indicates generally a bracket of yoke or Y form, having a horizontally disposed stem part I slidably adjustable in the carriage A', an arm 2 carrying the fluoroscopic screen S and an arm 3 carrying the tube head H, the parts of the bracket being so proportioned and arranged that the screen and head are located in spaced-relation, the arms being mounted on the stem part I for rotational adjustment together about the stem axis.

The tube head H comprises a housing enclosing an X-ray tube and its high tension transformer which may be immersed in oil sealed in a grounded container so that the head is shock-proof, and the housing also encloses a diaphragm for controlling the beam emitted from the head—so that the head has very substantial weight. The screen S, on the other hand, is of standard light construction and of much less weight than the head.

What has thus far been described is old and well known in the art.

According to this invention, the arm 2 of the bracket B and which supports the screen S, is substantially longer than the arm 3 which supports the head, to space the screen from the axis of the bracket stem part I sufficiently farther than the head is spaced on the opposite side from said axis, whereby the parts are in substantial balance with reference to this axis about which they are adjustable together as a unit. By this arrangement it will also be evident that the head has substantial motion about the axis, so that it has corresponding range of action for any position of the carriage A'.

The long arm of the bracket B which carries the screen, includes two members, 2 and 2', articulated as at 4 to permit adjustment of the screen S toward and from the head H, and swinging of the screen out of the X-ray path as when the head is to be employed for radiography.

Obviously when the bracket is disposed in an upright plane with the screen S above the head H, the weight of the screen and its bracket member 2' will tend to lower the screen, and means are provided for counterbalancing this weight.

In the embodiment illustrated in Figs. 4, 5 and 6, such means comprises a spring 5 disposed within a sleeve 6 slidable in the member 2 of the long arm of the bracket, which is hollow. One end of the spring 5 is connected with its end of the sleeve 6 as by a pin 7. The other member 2' of the bracket arm is connected by a flexible member such as the chain 8 to the opposite end of the spring 5 in such manner as by the face 9 over which the chain leads, that tension on the spring 5 will tend to straighten the member 2' relative to the member 2 and move the screen S from the head H.

For controlling the position of the sleeve 6 and thus the effectiveness of its spring 5, a stop pin 10 is movably mounted in the head part 11 of the bracket member 2 to either be engaged by the end of the sleeve 6 as illustrated in Figs. 5 and 6, or to clear the sleeve as illustrated in Fig. 4. For control of this pin 10 by the operator, a spring 13 is arranged to yieldably urge the pin into sleeve-engaging position and a lever 12 is provided having a handle portion projecting from the head 11 by which the pin may be moved against its spring 13 to the sleeve-clearing position of Fig. 4. For moving the sleeve 6 to a position wherein the spring 5 is effective upon the bracket member 2', and for preventing slack and consequent kinking of the chain 8, a retracting spring 14 is provided having one end connected to the sleeve 6 as by the pin 7 and its other end secured as by the fixed pin 15. The spring 14 is a light spring as compared with the spring 5, and insufficient to have appreciable effect upon the bracket member 2'.

Operation of the screen counterbalancing apparatus will be as follows: Commencing with the parts disposed as in Fig. 4, the bracket arms 2 and 2' being horizontal, the sleeve 6 with its spring 5 is freely slidable, and the spring 5 ineffective upon the bracket member 2'. The screen may therefore be freely adjusted, and will remain in any adjusted position.

When it is desired to move the bracket B on its axis to dispose the screen above the head H, the bracket member 2' is first moved to straightened position, which permits the spring 14 to move the sleeve 6 past the pin 10 which latter, urged by its spring 13, automatically locks the sleeve positioned as in Fig. 5. The bracket may then be adjusted to vertical position and the screen swung down over the head as in Fig. 1. This operation extends the spring 5 to effectively counterbalance the weight of the screen and its bracket member 2'. The face 9 has such curvature and extent relative to the pin 4 that the counterbalancing effect of the spring 5 is approximately uniform upon the screen through a large range of its articulated movement about the pin 4.

When it is desired to release the screen from the effect of the spring 5, as to re-employ the bracket in the horizontal position, the operator moves the arm 2' to the position shown in Fig. 5, then depresses the lever 12 to withdraw the pin 10 and release the sleeve 6, the parts being then positioned as originally.

The tube head H is carried by a yoke-shaped terminating member 3' of the arm 3 of the bracket B, the head being pivotally mounted on the member 3' for adjustment in the general plane of the bracket B and the member 3' being arranged for pivotal adjustment on the member 3 to permit adjustment of the head transversely of said plane. As illustrated in Fig. 4, a friction clamping jaw 16a on the member 3' is engageable with a collar 16 on the member 3 by thumb screw 17, to retain the member 3' in its adjusted positions.

The diaphragm within the tube head may comprise two pairs of shutters, the one pair acting at right angles to the other, both pairs being mounted in the cover part H' of the tube head, such arrangement being old and well known in the art. According to this invention a pair of plungers 18, 18a, are arranged with portions projecting through the cover H', each for actuation of one of the shutters as through linkage generally indicated at 19.

For control of the shutters by the operator at the screen S, independent of adjusted positions of the screen and tube head, a pair of handles 20, 20a, are mounted on the bracket member 2' adjacent the screen, and each handle is connected to one of the plungers 18, 18a, as by Bowden wires 21, 21a, each wire, as an inner element, having the usual laterally flexible but longitudinally inflexible outer element 22.

For detachment of such control means from the tube head, a plug 23 is detachably connected to the cover H' as by a wing nut 24, the outer Bowden elements 22 are secured in the plug 23, and each inner element 21 is provided with a pin 25, 25a. Each pin 25 is headed and its plunger 18 provided with an end socket, split to provide such engagement between pin and plunger that the plunger may be actuated by the pin in either direction to correspondingly actuate the shutter, yet the pin may be withdrawn from the plunger when the plug 23 is withdrawn. A key 26 is arranged to suitably index the plug 23 so that the control means can be connected to the diaphragm in only one position, and each of the handles 20 will always actuate its shutter only.

What we claim is:

1. X-ray apparatus of the class described comprising base means, bracket means mounted upon said base means for adjustment about a horizontal axis, a tube head and a fluoroscopic screen carried by said bracket means, on opposite sides of said axis for adjustment together there about as a unit, said screen being offset from said axis sufficiently to substantially balance said head thereabout.

2. X-ray apparatus of the class described comprising base means, bracket means mounted upon said base means for adjustment about a horizontal axis, a tube head and a fluoroscopic screen carried by said bracket means, on opposite sides of said axis for adjustment together thereabout as a unit, said bracket means having a long arm carrying said screen and a relatively short arm carrying said head, said long arm being articulate to permit adjustment of said screen toward and from said axis, and having means effective between its members to urge said screen from said axis at the will of the operator.

3. X-ray apparatus of the class described comprising base means, bracket means mounted upon said base means for adjustment about a horizontal axis, a tube head and a fluoroscopic screen carried by said bracket means, on opposite sides of said axis for adjustment thereabout together as a unit, said bracket means having an arm carrying said screen, of members articulated to permit adjustment of said screen toward and from said axis, spring means arranged to be effective between said members to balance said screen, and means for releasably securing an end of said spring means for controlling the effectiveness thereof at the will of the operator.

4. X-ray apparatus of the class described comprising base means, bracket means mounted upon said base means for adjustment about a horizontal axis, a tube head and a fluoroscopic screen carried by said bracket means, on opposite sides of said axis for adjustment together thereabout as a unit, said bracket means being articulated to provide adjustment of said screen in the plane of said axis, and having a hollow portion and spring means arranged therein to balance said screen in its articulated adjustment, and means for shifting said spring means along said hollow portion for controlling its effectiveness.

5. X-ray apparatus of the class described comprising base means, bracket means mounted upon said base means for adjustment about a horizontal axis, a tube head and a fluoroscopic screen carried by said bracket means, on opposite sides of said axis for adjustment together thereabout as a unit, said bracket means being articulated to provide adjustment of said screen in the plane of said axis, and having a hollow and spring means arranged therein to balance said screen in its articulated adjustment, and means for shifting said spring means along said hollow for controlling its effectiveness and including means yieldably urging said spring means in balancing direction.

6. X-ray apparatus of the class described comprising base means, bracket means mounted upon said base means for adjustment about a horizontal axis, a tube head and a fluoroscopic screen carried by said bracket means, on opposite sides of said axis for adjustment thereabout together as a unit, said bracket means having an arm carrying said screen, of members articulated to permit adjustment of said screen toward and from said axis, spring means carried by one of said members, means connecting one end of said spring means to the other member and including a flexible element, and means for releasably securing the other end of said spring means and including a retracting spring for taking up slack in said flexible element.

7. X-ray apparatus of the class described comprising base means, bracket means mounted upon said base means for adjustment about a horizontal axis, a tube head and a fluoroscopic screen carried by said bracket means, on opposite sides of said axis for adjustment thereabout together as a unit, said bracket means having an arm carrying said screen, of members articulated to permit adjustment of said screen toward and from said axis, sleeve means slidably mounted in one of said members, spring means within said sleeve means and connected at one end thereto, means connecting the other end of said spring means to the other member, and means for adjustably positioning said sleeve means in its member for controlling the effect of said spring means upon the other member.

8. X-ray apparatus of the class described comprising base means, bracket means mounted upon said base means for adjustment about a horizontal axis, a tube head and a fluoroscopic screen carried by said bracket means, on opposite sides of said axis for adjustment thereabout together as a unit, said bracket means having an arm carrying said screen, of members articulated to permit adjustment of said screen toward and from said axis, sleeve means slidably mounted in one of said members, spring means within said sleeve means and connected at one end thereto, means connecting the other end of said spring means to the other member, and means for adjustably positioning said sleeve means in its member for controlling the effect of said spring means upon the other member and including a retracting spring connected to an end of said sleeve means.

9. X-ray apparatus of the class described comprising base means, bracket means mounted upon said base means for adjustment about a horizontal axis, a tube head and a fluoroscopic screen carried by said bracket means, on opposite sides of said axis for adjustment thereabout together as a unit, said bracket means having an arm carrying said screen, of members articulated to permit adjustment of said screen toward and from said axis, sleeve means slidably mounted in one of said members, spring means within said sleeve means and connected at one end thereto, means connecting the other end of said spring means to the other member, and means for adjustably positioning said sleeve means in its member for controlling the effect of said spring means upon the other member and including stop means arranged to be engaged by an end of said sleeve means at the will of the operator.

10. X-ray apparatus of the class described comprising base means, bracket means mounted upon said base means for adjustment about a horizontal axis, a tube head and a fluoroscopic screen carried by said bracket means, on opposite sides of said axis for adjustment thereabout together as a unit, said bracket means having an arm carrying said screen, of members articulated to permit adjustment of said screen toward and from said axis, sleeve means slidably mounted in one of said members, spring means within said sleeve means and connected at one end thereto, means connecting the other end of said spring means to the other member, and means for adjustably positioning said sleeve means in its member for controlling the effect of said spring means upon the other member and including stop means arranged to be engaged by an end of said sleeve means at the will of the operator and a retracting spring connected to the opposite end of said sleeve means.

11. X-ray apparatus of the class described comprising base means, bracket means mounted upon said base means for adjustment about a horizontal axis, a tube head and a fluoroscopic screen carried by said bracket means, on opposite sides of said axis for adjustment thereabout together as a unit, said bracket means having an arm carrying said screen, of members articulated to permit adjustment of said screen toward and from said axis, sleeve means slidably mounted in one of said members, spring means within said sleeve means and connected at one end thereto, flexible means connecting the other end of said spring means to the other member, and means for adjustably positioning said sleeve means in its member for controlling the effect of said spring means upon the other member and including a retracting spring connected to an end of said sleeve means.

12. X-ray apparatus of the class described comprising base means, a tube head having a diaphragm, a fluoroscopic screen, bracket means mounting said head and screen upon said base means in spaced relation for adjustment together as a unit about an axis, and means providing control of said diaphragm by an operator at said screen, said control means comprising a member having a pair of elements leading within a plug element, means detachably connecting the plug element to said tube head, and means detachably connecting the inner elements to actuating parts of said diaphragm.

EDWIN R. GOLDFIELD.
CAPERTON B. HORSLEY.
RALPH C. SCHIRING.